(12) United States Patent
Duan et al.

(10) Patent No.: US 6,400,274 B1
(45) Date of Patent: Jun. 4, 2002

(54) HIGH-PERFORMANCE MOBILE POWER ANTENNAS

(75) Inventors: Dah-Weih Duan, Yorktown Heights; Daniel J. Friedman, Tarrytown; Harley Kent Heinrich, Brewster, all of NY (US); Ian Bardwell-Jones, Reston, VA (US); Lou Ruggiero, Danbury, CT (US)

(73) Assignee: Intermec IP Corp., Wilmington, DE (US)

( * ) Notice: Subject to any disclaimer, the term of this patent is extended or adjusted under 35 U.S.C. 154(b) by 0 days.

(21) Appl. No.: 09/426,235

(22) Filed: Oct. 25, 1999

Related U.S. Application Data

(63) Continuation of application No. 09/321,986, filed on May 28, 1999, application No. 09/426,235, which is a continuation-in-part of application No. 09/277,768, filed on Jan. 8, 1999, now Pat. No. 6,243,013, said application No. 09/321,986, is a continuation-in-part of application No. 08/733,684, filed on Oct. 17, 1996, now Pat. No. 5,889,489, which is a continuation-in-part of application No. 08/521,898, filed on Aug. 31, 1995, now Pat. No. 5,606,323, application No. 09/426,235, and a continuation-in-part of application No. 09/211,584, filed on Dec. 14, 1998, and a continuation-in-part of application No. 09/195,733, filed on Nov. 19, 1998, which is a continuation-in-part of application No. 09/114,037, filed on Jul. 10, 1998, which is a continuation of application No. 08/626,820, filed on Apr. 3, 1996, now Pat. No. 5,850,181, said application No. 09/321,986, and a continuation-in-part of application No. 09/266,973, filed on Mar. 12, 1999, which is a continuation-in-part of application No. 09/263,057, filed on Mar. 6, 1999, now abandoned.

(60) Provisional application No. 60/086,972, filed on May 28, 1998, provisional application No. 60/077,094, filed on Mar. 6, 1998, provisional application No. 60/077,872, filed on Mar. 13, 1998, and provisional application No. 60/070,347, filed on Jan. 2, 1998.

(51) Int. Cl.$^7$ .................................................. G08B 13/14
(52) U.S. Cl. ................................ 340/572.7; 340/572.1; 342/44
(58) Field of Search ........................... 340/572.7, 572.6, 340/572.4, 10.1, 10.34, 539, 551; 342/27, 44, 51

(56) References Cited

U.S. PATENT DOCUMENTS

| | | | |
|---|---|---|---|
| 5,305,008 A | * | 4/1994 | Turner et al. ................. 342/44 |
| 5,689,239 A | * | 11/1997 | Turner et al. ................ 340/572 |
| 5,793,305 A | * | 8/1998 | Turner et al. ................ 340/572 |
| 6,011,488 A | * | 1/2000 | Büsser ..................... 340/572.1 |
| 6,040,773 A | * | 3/2000 | Vega et al. ............... 340/572.1 |
| 6,054,925 A | * | 4/2000 | Proctor et al. ........... 340/572.7 |
| 6,140,924 A | * | 10/2000 | Chia et al. .............. 340/572.7 |

* cited by examiner

*Primary Examiner*—John A Tweel
(74) *Attorney, Agent, or Firm*—Rodney T. Hodgson

(57) ABSTRACT

An RFID tag's mobility can be increased and cost can be decreased by using high-performance mobile power antennas instead of battery powered tags. Disclosed are some power antennas that include a half wave rectifier, a full wave rectifier, and a voltage multiplier. These antennas can be cascaded to boost the power or voltage gain. Additionally, planar elements can be added to increase efficiency without decreasing mobility.

34 Claims, 7 Drawing Sheets

HIGH-PERFORMANCE MOBILE POWER ANTENNAS

CROSS-REFERENCE TO RELATED APPLICATIONS

This application is a continuation of application Ser. No. 09/321,986 filed May 28, 1999, which claims the benefit of provisional application No. 60/086,972 filed May 28, 1998, which application is specifically incorporated herein, in its entirety, by reference. The present application is a continuation-in-part of copending application Ser. No. 09/227,768 filed Jan. 8, 1999. Said application Ser. No. 09/321,986 is a continuation-in-part of application Ser. No. 08/733,684 filed Oct. 17, 1996, now U.S. Pat. No. 5,889,489 issued Mar. 30, 1999, which in turn is a continuation-in-part of application Ser. No. 08/521,898 filed Aug. 31, 1995, now U.S. Pat. No. 5,606,323 issued Feb. 25, 1997. The present application is a continuation-in-part of copending applications Ser. No. 09/114,037 filed Jul. 10, 1998, Ser. No. 09/195,733 filed Nov. 19, 1998, and Ser. No. 09/211,584 filed Dec. 14, 1998, which is a continuation of Ser. No. 08/626,820 filed Apr. 3, 1996, now U.S. Pat. No. 5,850,181 issued Dec. 15, 1998. Said application Ser. No. 09/321,986 is also a continuation in-part of application Ser. No. 09/263,057 filed Mar. 6, 1999 which claims the benefit of provisional application No. 60/077,094 filed Mar. 6, 1998, and a continuation in-part of application No. Ser. 09/266,973 filed Mar. 12, 1999 which claims the benefit of provisional application No. 60/077,872 filed Mar. 13, 1998. application Ser. No. 09/222,598 filed Dec. 29, 1998, provisional application No. 60/070,347 filed Jan. 2, 1998, and U.S. Pat. No. 5,606,323 issued Feb. 25, 1997 are each incorporated herein by reference in its entirety. All of the above provisional and nonprovisional applications are hereby incorporated herein by reference in their entireties including drawings and appendices.

FIELD OF THE INVENTION

The field of the invention relates to the field of Radio Frequency (RF) transponders (RF Tags) which receive RF electromagnetic radiation from a base station whether or not the RF tags have a battery (which may be charged by the received RF energy), and send information to the base station by modulating the load of an RE antenna,

BACKGROUND OF THE INVENTION

There are many wireless communication applications in the prior art that use mobile communication units. One application area is radio frequency identification (RF ID) systems, which involve a large number of these mobile units. A mobile antenna is an antenna that is attached to an article capable of moving.

There is a desire to minimize the cost of these mobile units, particularly when, such as in RF ID, there are a large number of mobile units in a system. While a battery is a reliable way to supply power to these mobile units, there are significant manufacturing costs incurred in using this device. Furthermore, batteries dictate certain shapes of the mobile unit, occupy area on the mobile circuit, and reduce the mechanical flexibility of the mobile circuit.

Passive mobile circuits exist in the prior art that have no battery supplying power to the circuit. These passive mobile circuits use the antenna structure on the circuit to seize energy from an electromagnetic field received by the passive circuit. The antenna used the energy in the field to provide the passive circuit with the power (both energy and voltage) to operate. In addition, these antennas detect (field detection) the presence of the electromagnetic field and may re-radiate a signal.

Typical field probing antennas in the prior art are made of short (non-resonant) dipoles loaded with a diode that is connected to the signal processing equipment (part of the mobile circuit) via a pair of high-impedance leads. These field-probing antennas are designed to minimize the disturbance to the field being detected.

One fundamental problem with passive tags is that the range is limited by the voltage picked up by the tag antenna and rectified by the tag power conditioning circuits. The voltage must be high enough to run the tag electronics, and the voltage is generally the limiting factor in determining the distance from the base station antenna at which the tags may be used. Even active tags having a battery to run the tag electronics are limited in the voltage picked up by the tag antenna.

SUMMARY

Included are several variations of a mobile power antenna. Disclosed are resonant antennas coupled to a half wave rectifier, a full wave rectifier, and a voltage multiplier. This disclosure also shows a cascaded antenna. Additionally, planar elements can be added to these antennas to increase efficiency without reducing mobility.

The present invention also relates to a system, apparatus and method to use multiple antennas to receive RF power and signals from a base station, where circuitry is provided which will cascade the DC voltages produced by rectifying the signals at each of the multiple antennas.

An object of this invention is an improved antenna for powering a passive circuit on a mobile unit. A second object of this invention is an improved antenna for powering a passive circuit on a mobile unit when the antenna is non-resonant with the received frequency. A third object of this invention is an improved antenna for collecting power from an electromagnetic field of minimal power. A fourth object of this invention is an improved antenna and associated circuit for generation of a voltage from an electromagnetic field of minimal power.

DETAILED DESCRIPTION

Figure 1A:
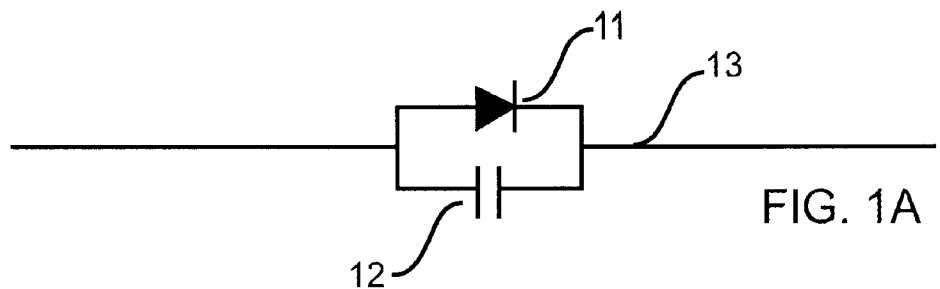
FIGS. 1A–1D show antennas that utilize a half wave rectifying structure.
Figure 1B:
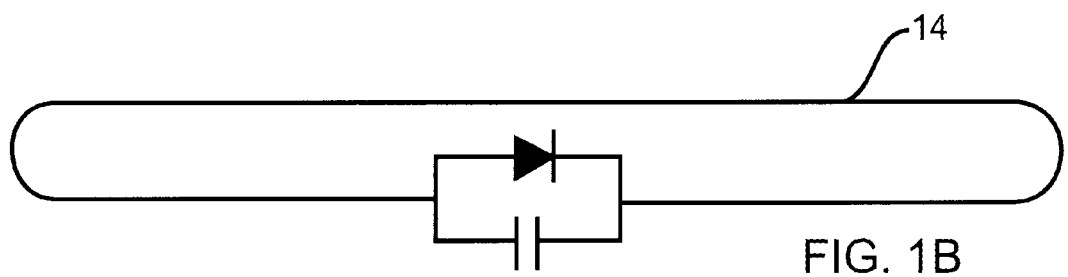
Figure 1C:
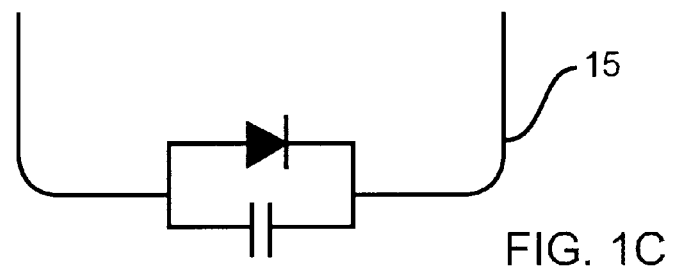
Figure 1D:
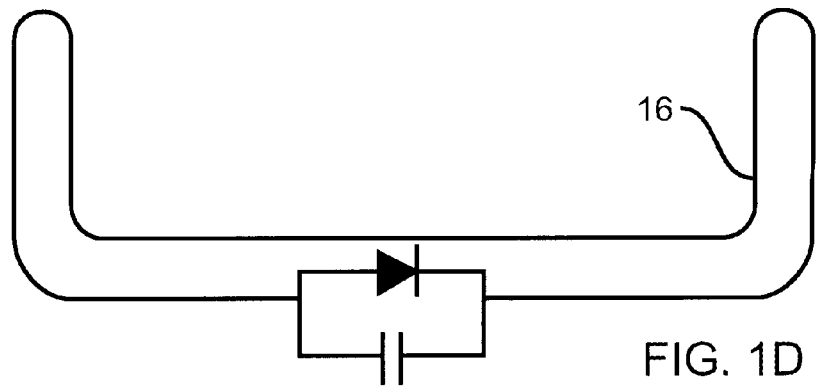
Figure 2A:
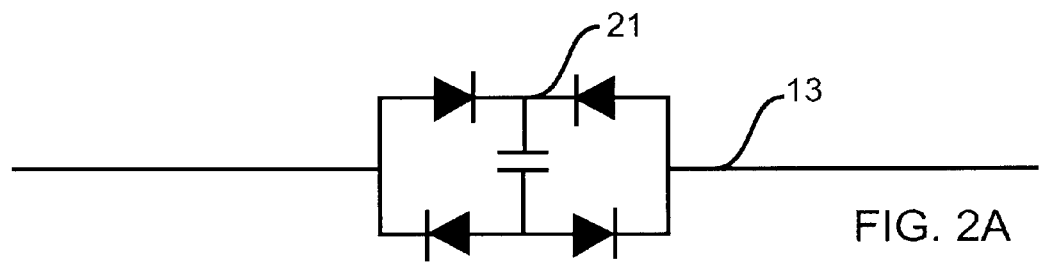
FIGS. 2A–2D show antennas that utilize a full wave rectifying structure.
Figure 2B:
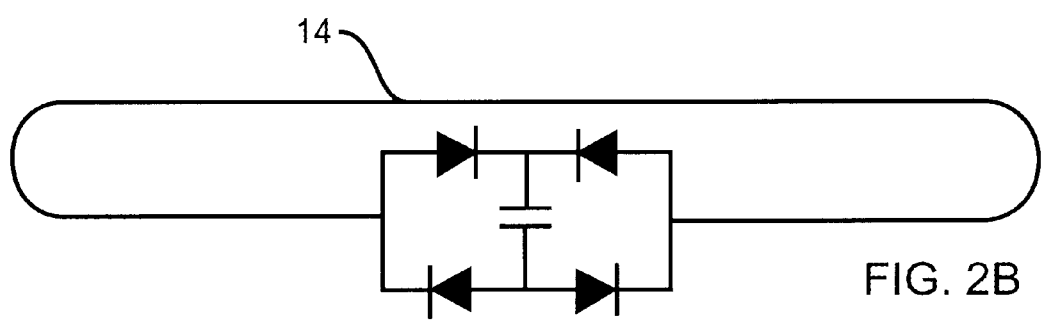
Figure 2C:
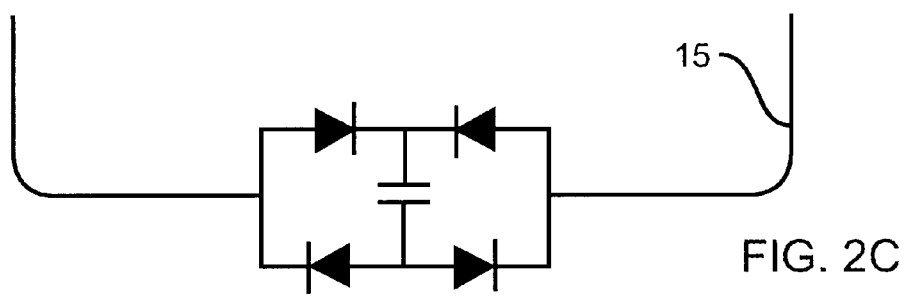
Figure 2D:
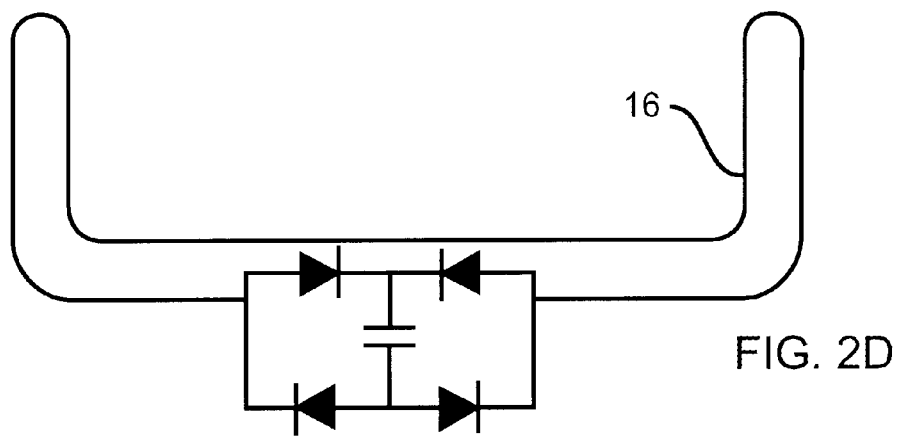
Figure 3A:
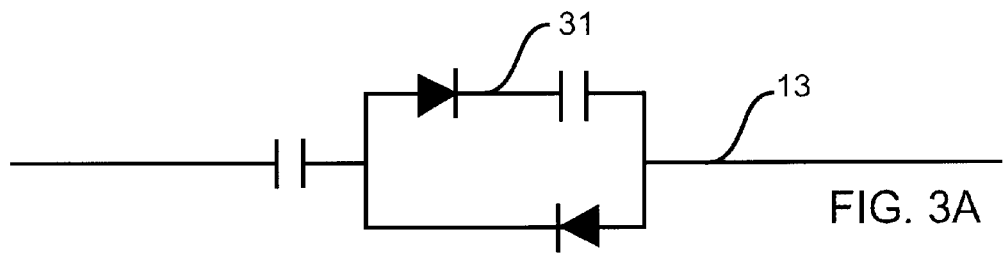
FIGS. 3A–3D show antennas that utilize a voltage doubling structure.
Figure 3B:
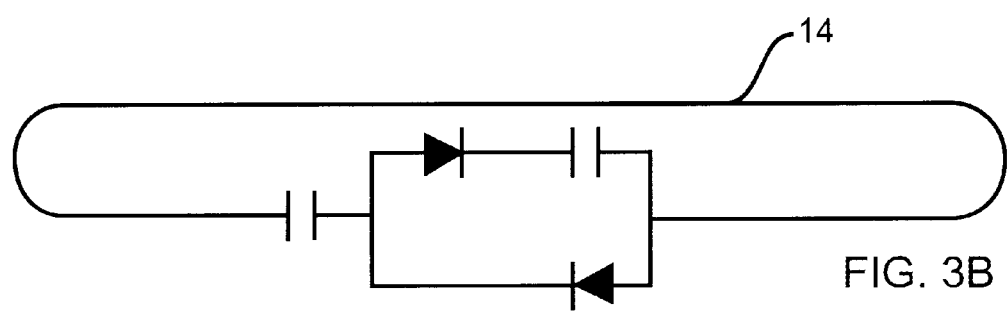
Figure 3C:
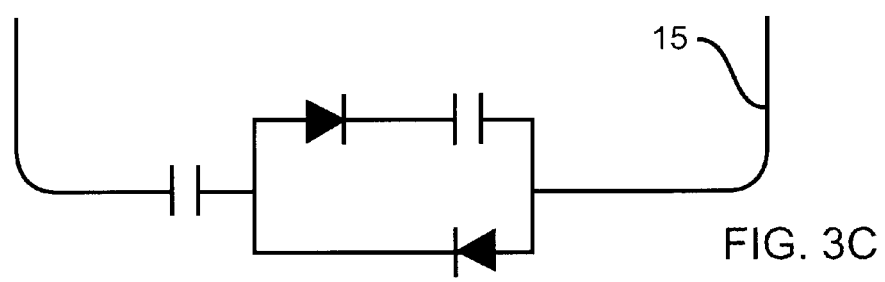
Figure 3D:
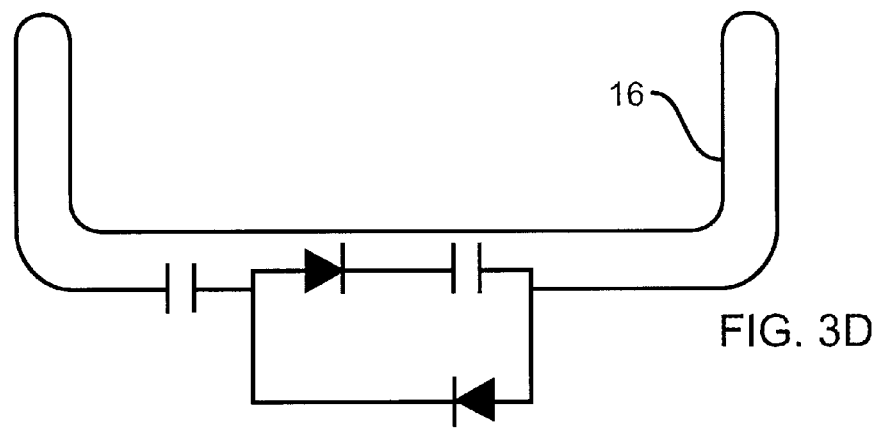

Several mobile power antennas with resonant structures are designed and depicted in FIGS. 1A–1D. FIG. 1A shows a half wave dipole (13) loaded with a diode (11) and a capacitor (12). FIG. 1B illustrates a full-wave folded-dipole antenna (14), which may double or quadruple the rectified voltage across the diode depending on the intensity of the incident wave. FIG. 1C demonstrates a resonant bent-dipole antenna (15), in which reduced polarization sensitivity and broadened bandwidth is realized. FIG. 1D is a folded-dipole antenna (16) bent for similar purpose. It must be emphasized that the antennas in FIGS. 1A–1D can all be implemented in a planar structure, and possess a minimum area for the functionality described. These characteristics facilitate low-cost manufacturing process.

Antennas in FIGS. 1A–1D utilize only the half cycle (of the incident field) in which the diode is conducting to establish a voltage. In order to improve the efficiency in collecting power, one may apply a full-wave rectifying circuit (FIGS. 2A–2D, part labeled 21), across the antenna terminals to extract energy from the field in both half cycles. When a larger voltage needs to be established, on the other hand, one may use a voltage-multiplying circuit that produce N times the voltage for the same incident field intensity. FIGS. 3A–3D depict an example: antennas with a voltage-doubling circuit (31). The combination of resonant structures and appropriate rectifying circuits result in antennas with high-performance powering capabilities. It should be mentioned that the increased number of devices in FIGS. 2A–2D or FIGS. 3A–3D do not increase the manufacturing cost if they are built as part of an integrated circuit.

Figure 4:
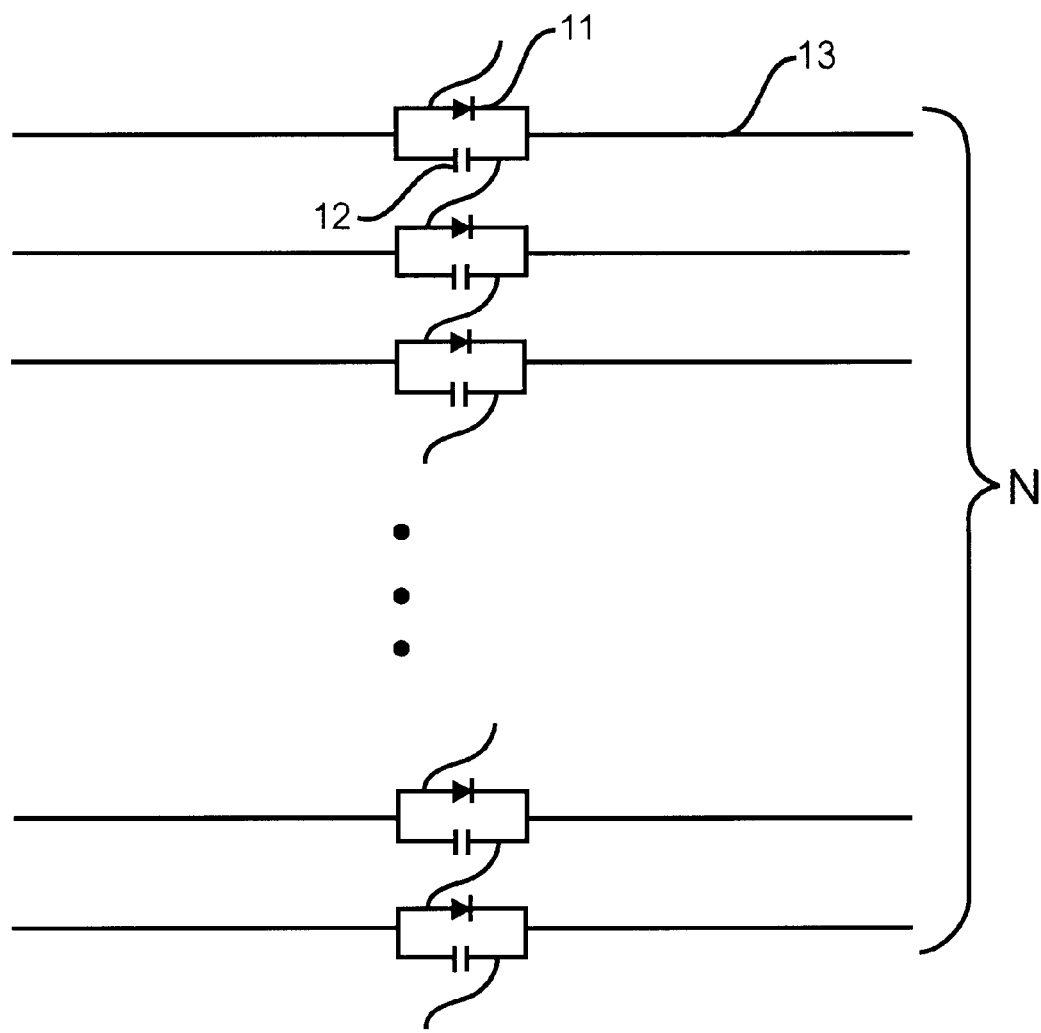
FIG. 4 show cascaded antennas.

One may use a cascaded antenna array to achieve ultra-high rectified voltages as shown in FIG. 4, in which the element antennas, being illustrated by dipoles, can be any of those depicted in FIGS. 1A–1D, 2A–2D, or 3A–3D. The rectified voltage is increased N times for N antennas in tandem. For all antennas mentioned above, a pair of not-high-impedance leads is used to extract the power to the load (circuitry). The range of optimum impedance for each configuration depends on the antenna impedance, can be determined experimentally using a pair of leads with variable resistance.

Figure 5A:
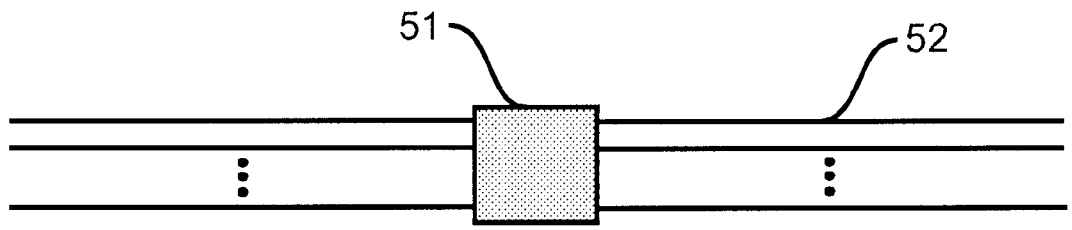
FIGS. 5A–5C show antennas with planar elements.
Figure 5B:
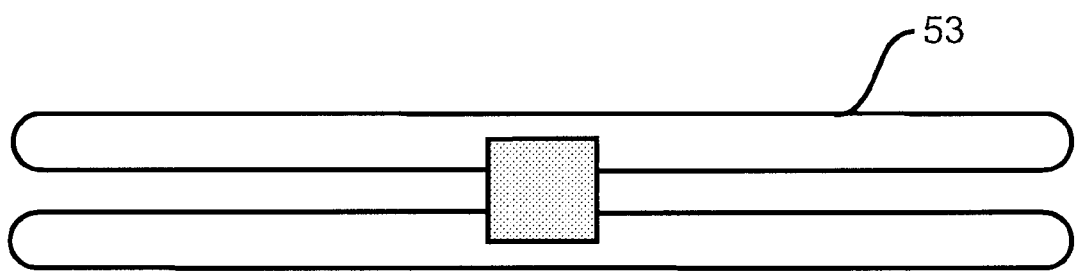
Figure 5C:
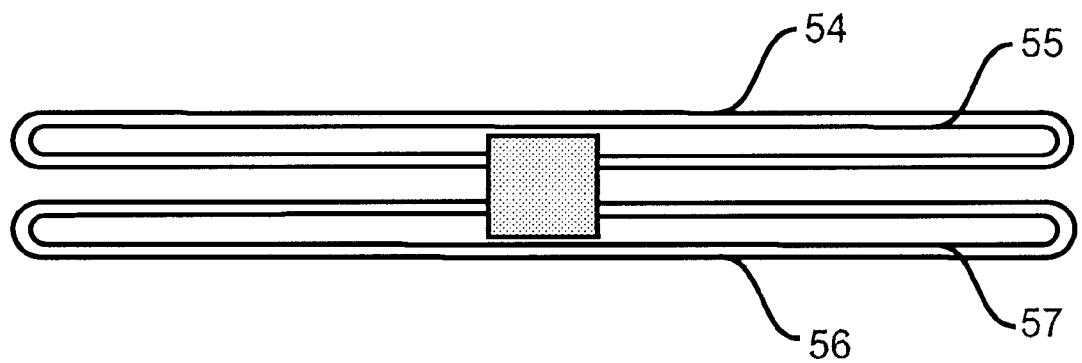

Three-dimensional constructions such as via holes, jumping wires, etc, are costly to manufacture. It is therefore desirable to conceive two-dimensional (planar) layouts for the cascaded antenna arrays. Several of these planar implementations are illustrated in FIGS. 5A, 5B and 5C, in which the gray-shaded boxes (51) represent IC's that contain the necessary rectifying circuits and other processing circuitry. FIG. 5A shows how to attach an array of several dipoles (52) to an IC in planar fashion. Obviously, a limiting factor on the maximum number of dipoles is the circumference of the IC. FIG. 5B illustrates a planar two-element folded-dipole antenna array (53). Although not depicted, the bent antennas can also be arrayed in a way similar to FIGS. 5A or 5B depending on whether the antennas have open ends or closed ends. A mixture of open-ended and close-ended antennas may be combined in the same array. If more than two folded-dipole antennas are to be arranged two-dimensionally, one may have to use different but similar antenna sizes (54–57) as shown in FIG. 5C. Besides improved powering capability, this "embedded" topology is preferred for broadened bandwidth.

U.S. Pat. No. 5,850,181 issued Dec. 15, 1998 illustrates overall systems for supplying RF energy to passive radio frequency identification transponders, which systems are specifically applied to passive RFID tags incorporating each of the respective configurations of antennas 13–16, 52, 53 and 54–57, with each of the power collection circuits 11, 21, 31 and 51 (and including each of the antenna-circuit configurations specifically shown in FIGS. 1A–1D, 2A–2D, 3A–3D, 4 and 5A–5C. Where such RF tags are to be energized by RF signals of different frequencies in a given frequency band such as 902–928 MHz, 2400–2483.5 MHz and 5725–5850 MHz, the antenna-power collection circuit configurations disclosed herein may be resonant at a mean or median frequency of the respective frequency band, so that the antenna-power collection circuit configurations are substantially resonant at the respective frequencies of the given frequency band, and power is extracted to the load circuitry from the antenna-power collection circuit configurations by a pair of not-high-impedance leads which present an impedance selected experimentally for maximum power transfer to the load circuitry, for example.

An information signal may be derived from the antenna configurations disclosed herein, as shown in the various embodiments of Friedman and Heinrich patent application Ser. No. 08/733,684 filed Oct. 17, 1996, which is hereby incorporated herein by reference in its entirety. U.S. Pat. No. 5,606,323 issued Feb. 25, 1997 is also incorporated herein by reference in its entirety for disclosing passive RF tags to which the teachings of the present invention may be applied.

Figure 6:
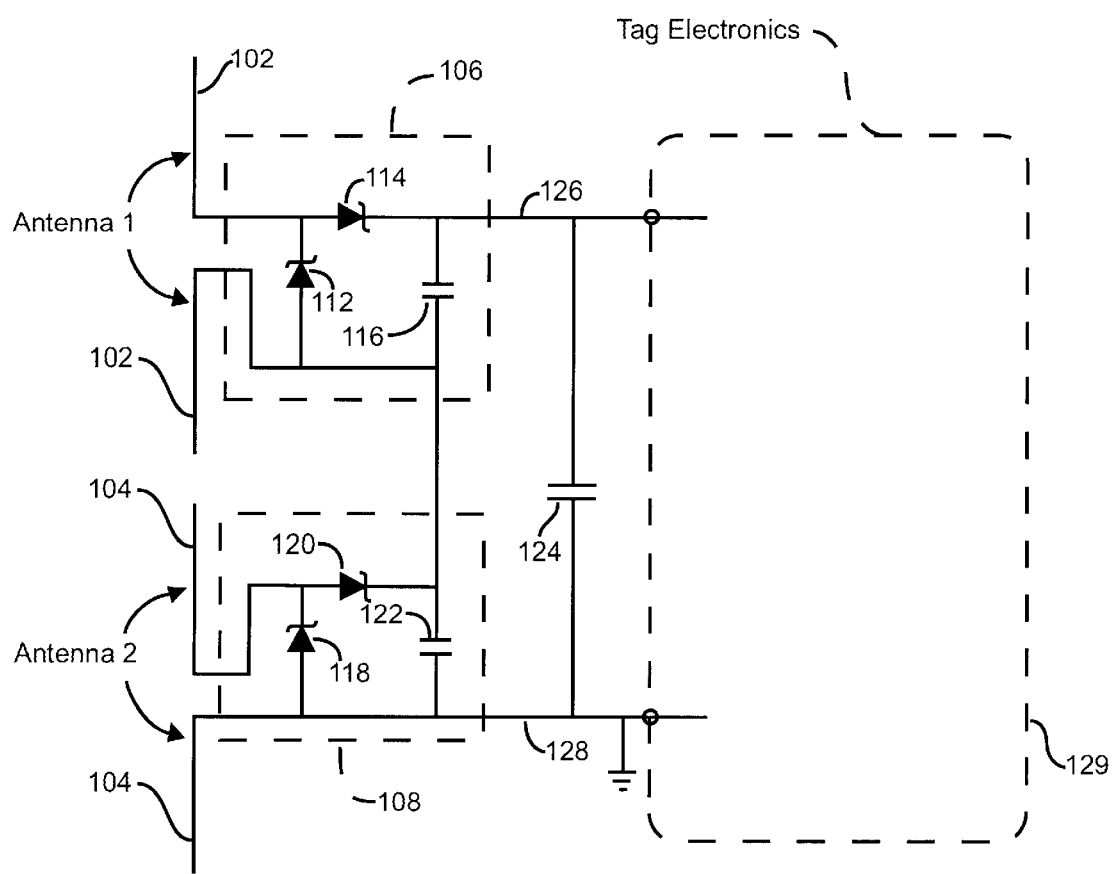
FIG. 6 shows a sketch of a circuit diagram for receiving power from two tag antennas.

FIG. 6 shows a sketch of a circuit diagram for receiving power from two tag antennas 102 and 104. Tag antennas 102 and 104 are sketched here as dipole antennas, but they could be any one or any combination of dipole, patch, loop, or slot antennas as are known in the art. Tag antennas 102 and 104 could also be any one of the above and/or any one or any combination of DOG, HOG, or SOG antennas which are described in great detail in: U.S. application Ser. No. 09/191, 641 filed Nov. 13, 1998 by Duan et al. entitled "RF Identification Transponder having a spiral antenna", now U.S. Pat. No. 6,118,379 issued Sep. 12, 2000; U.S. application Ser. No. 09/192,063 filed Nov. 13, 1998 by Duan et al. entitled "RF Identification Transponder having a helical antenna"; U.S. application Ser. No. 09/191,642 filed Nov. 13, 1998 by Duan et al. entitled "RF Identification Transponder employing patch antenna", now U.S. Pat. No. 6,215,402 issued Apr. 10, 2001; and U.S. application Ser. No. 09/192,052 filed Nov. 13, 1998 by Duan et al. entitled "Distributed Impedance matching circuit for high reflection coefficient load", now U.S. Pat. No. 6,177,872 issued Jan. 23, 2001, which are hereby incorporated by reference in this application. Of particular importance to the invention are the innovative impedance matching schemes noted in the above identified applications. Tag antennas 102 and 104 are shown in FIG. 6 providing power and information to voltage doubling circuits 106 and 108 respectively. Voltage doubling circuits 106 and 108 are well known voltage doubling circuits for providing power to passive RF tags, and could be replaced with single rectification circuits or higher order cascade voltage multiplication circuits as known in the art. RF diodes 112 and 114 act together to charge capacitor 116. Elements 118, 120 and 122 perform a similar function in circuit 108. Circuits 106 and 108 charge capacitor 124 to a voltage twice the voltage available with a single RF diode; capacitor 124 may act as a power supply for tag electronics 129, or may act as a modulated signal receiver for tag electronics in the case that the tag electronics 129 have a battery power supply as in the case of an active RF Tag. Power or signals are fed into the tag electronic section over lines 126 and 128 respectively. Line 128 is shown as the conventional ground. The tag electronics may also receive modulated signals by many other means than by measuring voltage across capacitor 124. For example, signals may be recovered by measuring the voltage across capacitors 116 or 122, or receiving circuits may be added as shown in incorporated U.S. Pat. application Ser. No. 08/733,684, (now U.S. Pat. No. 5,889,489 issued Mar. 30, 1999) which are completely apart from the power receiving circuis 106 and 108.

The tag electronics may also receive modulated signals by many other means than by measuring voltage across capacitor 124. For example, signals may be recovered by measuring the voltage across capacitors 116 or 122, or receiving circuits may be added as shown in incorporated U.S. Pat. application Ser. No. 08/733,684 which are completely apart from the power receiving circuits 106 and 108.

Modulation of the antenna reflectance characteristics to send signals from the tag to the base station may be performed by modifying the bias conditions on one or more ofdiodes 112, 114, 118, 120, or by shorting out capacitors 116, 122, and/or 124 under control of the tag electronic circuitry. (Circuits not shown).

Figure 7:
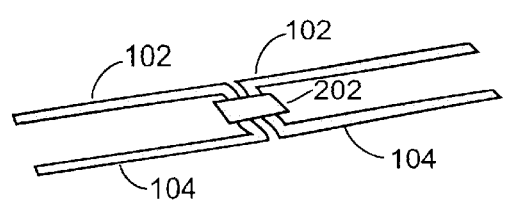
FIG. 7 shows a sketch of an RF tag having two dipole antennas.

FIG. 7 shows a sketch of an RF tag having two dipole antennas 102 and 104 connected to a semiconductor chip 202 which contains the tag electronic circuitry and the RF diodes and capacitors shown in FIG. 6. The dipole antennas 102 and 104 may be close together and closely coupled as shown in FIG. 7, or they may be widely separated (by more than the wavelength of the RF radiation which they are receiving) and hence not closely coupled.

Figure 8:
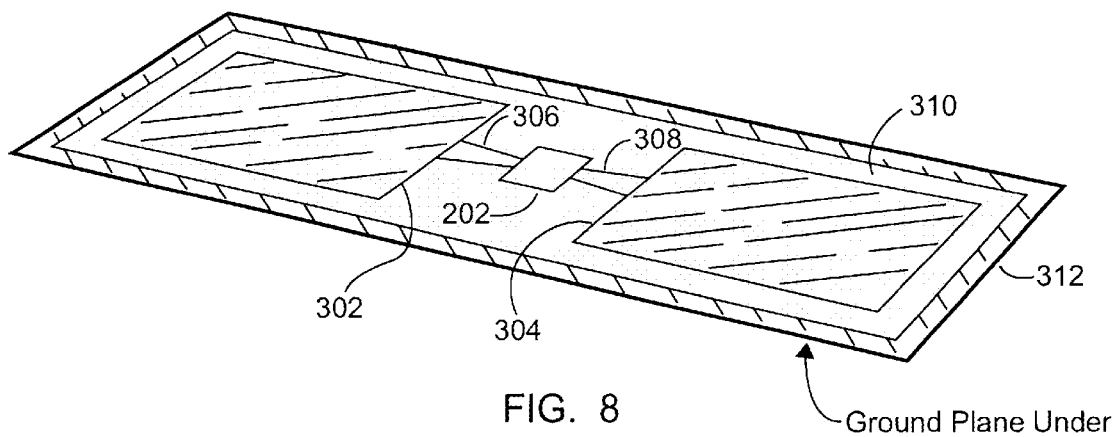
FIG. 8 shows a sketch of an RF tag having two patch antennas.

FIG. 8 shows a sketch of an RF tag having two patch antennas 302 and 304 feeding power or information to a semiconductor chip 202 through impedance matching sections 306 and 308. Impedance matching strips 306 and 308 may be short so that patch antennas 302 and 304 are closely coupled, or may be long so that they are not closely coupled. Patch antennas 302 and 304 are made from electrically conducting material such as metal or conducting polymer material, and are generally connected to a dielectric material 310 which separated patches 302 and 304 from a conducting ground plane 312.

From FIGS. 7 and 8, it is easy to see that one patch antenna may be combined with one dipole antenna to produce more voltage than a single antenna. Note also that patch antennas 302 and 304 could both be circular polarized antennas of opposite handedness, so that at least some voltage would be generated by the combination, where a single antenna might not receive any power or information. In the same way, dipole antennas 102 and 104 could be constructed so that they are mutually perpendicular, instead of parallel as shown. In this case, linearly polarized RF radiation would give at least some power to the combination of the two antennas.

Figure 9:
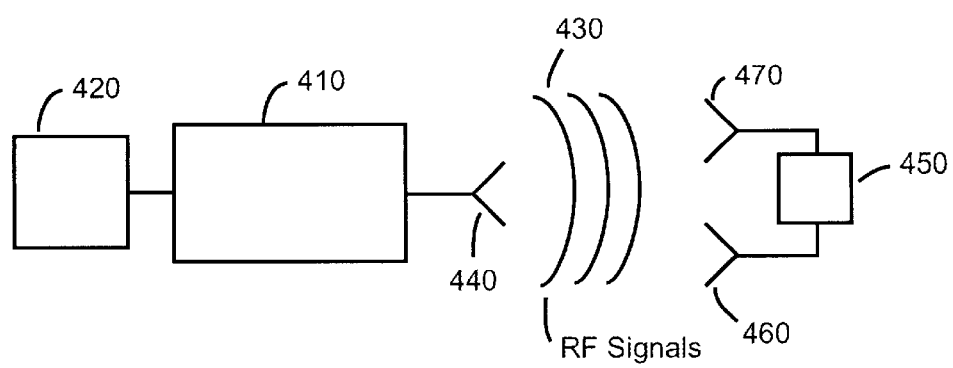
FIG. 9 shows a sketch of a system for communicating power and information between a base station and an RF tag.

FIG. 9 shows a sketch of a base station 410 connected to a computer 420 which is used to send and receive RF signals 430 through antenna 440 to and from an RF tag 450 having two antennas 460 and 470. Obviously, many modifications and variations of the present invention are possible in light of the above teachings. It is therefore to be understood that, within the scope of the appended claims, the invention may be practiced otherwise then as specifically described.

RELATED PATENTS AND APPLICATIONS

Related U.S. patents assigned to the assignee of the present invention include: U.S. Pat. Nos. 5,521,601; 5,528, 222; 5,538,803; 5,550,547; 5,552,778; 5,554,974; 5,563, 583; 5,565,847; 5,606,323; 5,635,693; 5,673,037; 5,680, 106; 5,682,143; 5,729,201; 5,729,697; 5,736,929; 5,739, 754; 5,767,789; 5,777,561; 5,786,626; 5,812,065; 5,821, 859; 5,850,181; and 5,874,902. U.S. patent applications assigned to the assignee of the present invention include: application Ser. No. 08/694,606 filed Aug. 9, 1996 entitled "RFID System with Write Broadcast Capability" by Cesar et al.; (now U.S. Pat. No. 5,942,987 issued Aug. 24, 1999); application Ser. No. 08/790,639 filed Jan. 29, 1997, (now U.S. Pat. No. 6,097,347 issued Aug. 1, 2000) ; application Ser. No. 08/790,640 filed Jan. 29, 1997, now U.S. Pat. No. 6,028,564 issued Feb. 22, 2000); application Ser. No. 09/153,617 filed Sep. 15, 1998, entitled "RFID Interrogator Signal Processing System for Reading Moving Transponder," by Zai et al., (now U.S. Pat. No. 6,122,329 issued Sep. 19, 2000); application Ser. No. 08/862,149 filed May 23, 1997; application Ser. No.08/862,912 filed May 23, 1997, (now U.S. Pat. No. 5,966,082 issued Oct. 12, 1999); application Ser. No. 08/862,913 filed May 23, 1997 (now U.S. Pat. No. 6,288,629 issued Sep. 11, 2001); application Ser. No. 60/079,852 filed Mar. 30, 1998; application Ser. No. 09/277,271 filed Mar. 26, 1999, (now U.S. Pat. No. 6,147, 606 issued Nov. 14, 2000); application Ser. No. 60/079/391 filed Mar. 26, 1998; and U.S. application Ser. No. 09/192, 052 filed Nov. 13, 1998 by Duan et al. entitled "Distributed Inpedance Matching Circuit for High Reflection Coefficient Load", (now U.S. Pat. No. 6,177,872 issued Jan. 23, 2001). The above identified U.S. patents and U.S. patent applications are hereby incorporated herein by reference in their entireties.

The following U.S. patent applications are hereby incorporated herein by reference in their entirety. Application Ser. No. 08/790,640, filed on Jan. 29, 1997 for Duan, et al., entitled "Wire Antenna with Stubs to Optimize Impedance for Connecting to a Circuit".

The following U.S. provisional patent applications are hereby incorporated herein by reference in their entirety. Application Ser. No. 60/079,613, filed on Mar. 27, 1998 for Duan, et al., entitled "Methods of Maximizing Operating Distance for RFID Tags". Application Ser. No. 60/078,287, filed on Mar. 17, 1998 for Duan, et al., entitled "Methods of Impedance Matching for Circularly-Polarized Patch Antenna RFID Tag". Application Ser. No. 60/078,220, filed on Mar. 16, 1998 for Duan, et al., entitled "RFID Tags Using High Gain Antennas".

In view of the above disclosure of the present application, including all associated drawings, and the material incorporated hereby by reference, other modifications, adaptations, variations and alternative embodiments may be effected without departing from the spirit and scope of the present disclosure.

INCORPORATION BY REFERENCE

Related U.S. patent application "Cascaded DC Voltages of Multiple Antenna RF Tag Front-end Circuits" with application Ser No. 09/227,768 filed on Jan. 8, 1999 is herein incorporated by reference.

What is claimed is:

1. An RF tag system for collecting power from an electromagnetic field with a carrier frequency comprising:
   an antenna configuration that is substantially resonant at the carrier frequency and is excited by the electromagnetic field to cause an induced current to be present at antenna terminals of the antenna configuration, the induced current being at the carrier frequency;
   one or more rectifiers that rectifies the induced current at the antenna terminals;
   one or more capacitors that collects the rectified induced current to develop a voltage sufficient to power an electric circuit; and
   attached RF tag circuitry comprising the electric circuit.

2. An antenna power collector system for collecting power from an electromagnetic field with a carrier frequency comprising:

a dipole antenna that is substantially resonant with the carrier frequency and is excited by the electromagnetic field that causes an induced current to be present at two antenna terminals, the induced current being at the carrier frequency;

one or more rectifiers that rectifies the induced current at the antenna terminals;

a modulation circuit that shorts and opens the antenna terminals at a modulation frequency in order to change the antenna impedance;

one or more capacitors that collect the rectified induced current to develop a voltage sufficient to power an electric circuit, the voltage being developed within one period of the modulation frequency.

3. An antenna power collector system, as in claim 2, where the rectifier and capacitor form a half wave rectifier.

4. An antenna power collector system, as in claim 3, where the dipole antenna is a folded dipole antenna.

5. An antenna power collector system, as in claim 3, where the dipole antenna is a bent dipole antenna.

6. An antenna power collector system as in claim 3, where the dipole antenna is a bent, folded dipole antenna.

7. An antenna power collector system, as in claim 2, where the rectifier and capicitor form a full wave recifier.

8. An antenna power collector system as in claim 7, where the dipole antenna is a folded dipole antenna.

9. An antenna power collector system, as in claim 7, where the dipole antenna is a bent dipole antenna.

10. An antenna power collector system, as in claim 7, where the dipole antenna is a bent, folded dipole antenna.

11. An antenna power collector system, as in claim 2, where the recifier and capicitor form a voltage doubling circuit.

12. An antenna power collector system, as in claim 11, where the dipole antenna is a folded dipole antenna.

13. An antenna power collector system, as in claim 11, where the dipole antenna is a bent, folded dipole antenna.

14. An antenna power collector system, as in claim 11, where the dipole antenna is a bent, folded dipole antenna.

15. An antenna power collector system, as in claim 2, where the rectifier and capacitor form a voltage N multiplier circuit.

16. An antenna power collector system, as in claim 15, where the dipole antenna is a folded dipole antenna.

17. An antenna power collector system, as in claim 15, where the dipole antenna is a bent dipole antenna.

18. An antenna power collector system, as in claim 15, where the dipole antenna is a bent, folded dipole antenna.

19. An antenna power collector system for collecting power from an electromagnetic field with a carrier frequency comprising:

a dipole antenna that is resonant with the carrier frequency and is excited by the electromagnetic field that causes an induced current to be present at two antenna terminals, the induced current being at the carrier frequency;

one or more rectifiers that rectifies the induced current at the antenna terminals;

a modulation circuit that shorts and opens the antenna terminals at a modulation frequency in order to change the antenna impedance;

one or more capacitors that collect the rectified induced current to develop a voltage sufficient to power an electric circuit, the voltage being developed within one period of the modulation frequency, the capacitors combined with the rectifiers to form two or more rectifier circuits that are connected in series to increase the voltage that powers the electric circuit.

20. An antenna power collector system, as in claim 19, where the rectifier circuits can be any of the type including a half wave rectifier, a full wave rectifier, a voltage doubler, and a voltage multiplier.

21. An antenna power collector syste, as in claim 20, where the dipole antenna is a folded dipole antenna.

22. An antenna power collector system, as in claim 20, where the dipole antenna is a bent dipole antenna.

23. An antenna power collector system, as in claim 20, where the dipole antenna is a bent, folded dipole antenna.

24. An antenna power collector system for collecting power from an electromagnetic field with a carrier frequency comprising: p1 an array of two or more dipole antennas that are resonant at the carrier frequency and are excited by the electromagnetic field to cause an induced current to be present at two antenna terminals on each of the antennas, the induced current being at the carrier frequency;

one or more rectifiers associated with each antenna that rectifies the induced current at the antenna terminals of each antenna respectively;

a modulation circuit that shorts and opens all the antenna terminals at a modulation frequency in order to change the antenna impedance of each antenna;

one more capacitors associated with each antenna that collects the rectified induced current and together with the rectifier associated with the respective antenna forms a rectifier circuit for each antenna; whereby the rectifier circuit for each antenna is connected in series to develop a voltage sufficient to power an electric circuit, the voltage being developed within one period of the modulation frequency.

25. An antenna power collecting system, as in claim 24, where one or more of the rectifying circuits is a half wave rectifier.

26. An antenna power collecting system, as in claim 24, where one or more of the rectifying circuits is a full wave rectifier.

27. An antenna power collecting system, as in claim 24, where one or more of the rectifying circuits is a voltage doubler.

28. An antenna power collecting system, as in claim 24, where one or more of the rectifying circuits is a voltage multiplier.

29. An antenna power collecting system, as in claim 24, where one or more of the dipoles is coplanar with the connections connecting the rectifier circuits.

30. An antenna power collecting system, as in claim 29, where one or more of the dipoles is a folded dipole antenna.

31. An antenna power collecting system, as in claim 29, where one or more of the dipole antennas is a bent dipole antenna.

32. An antenna power collecting system, as in claim 29, where one or more of the dipole antennas is a folded, bent dipole antenna.

33. An antenna power collecting system, as in claim 30, where one or more of the folded dipole antnas surrounds one or more other folded dipole antennas.

34. An antenna power collecting system, as in claim 33, where the folded dipole antennas are within twenty percent of each other in length.

* * * * *